United States Patent
You et al.

(10) Patent No.: US 10,466,715 B2
(45) Date of Patent: Nov. 5, 2019

(54) APPARATUS AND METHOD FOR CONTROLLING NARROW ROAD DRIVING OF VEHICLE

(71) Applicants: Hyundai Motor Company, Seoul (KR); Kia Motors Corporation, Seoul (KR); Industry-University Cooperation Foundation Hanyang University, Seoul (KR)

(72) Inventors: Byung Yong You, Gyeonggi-do (KR); Jong Woo Lim, Seoul (KR); Keon Chang Lee, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 169 days.

(21) Appl. No.: 15/655,368

(22) Filed: Jul. 20, 2017

(65) Prior Publication Data
US 2018/0164832 A1 Jun. 14, 2018

(30) Foreign Application Priority Data
Dec. 14, 2016 (KR) .......................... 10-2016-0170213

(51) Int. Cl.
*G05D 1/02* (2006.01)
*G06T 7/50* (2017.01)
(Continued)

(52) U.S. Cl.
CPC .......... *G05D 1/0251* (2013.01); *B60W 30/18* (2013.01); *B60W 40/02* (2013.01); *B60W 40/06* (2013.01);
(Continued)

(58) Field of Classification Search
CPC ...... B60W 40/02; B60W 40/06; B60W 50/14; G05D 1/02; G06K 2209/40; G06T 15/08
(Continued)

(56) References Cited

U.S. PATENT DOCUMENTS

RE37,610 E 3/2002 Tsuchiya et al.
6,732,049 B2 5/2004 Sato et al.
(Continued)

FOREIGN PATENT DOCUMENTS

KR 10-1438876 9/2014

*Primary Examiner* — Atul Trivedi
(74) *Attorney, Agent, or Firm* — Mintz Levin Cohn Ferris Glovsky and Popeo, P.C.; Peter F. Corless

(57) ABSTRACT

An apparatus for controlling narrow road driving of a vehicle includes: an image transform unit generating a depth map using depth information of an object in a front image of a road on which the vehicle travels and generating a height map of the front image by transforming the generated depth map; a map analysis unit recognizing the object and calculating a driving allowable area of the road based on the generated height map; a determination unit determining whether the road is a narrow road based on the calculated driving allowable area and, when the road is determined to be the narrow road, determining whether the vehicle is able to pass through the narrow road; and a signal processing unit controlling driving of the vehicle on the narrow road based on the determination of whether the vehicle is able to pass through the narrow road.

20 Claims, 9 Drawing Sheets

(51) Int. Cl.

| | | |
|---|---|---|
| *G06T 7/70* | (2017.01) | |
| *G06K 9/00* | (2006.01) | |
| *B60W 50/14* | (2012.01) | |
| *B60W 30/18* | (2012.01) | |
| *B60W 40/02* | (2006.01) | |
| *B60W 40/06* | (2012.01) | |
| *G06T 15/08* | (2011.01) | |
| *H04N 13/239* | (2018.01) | |
| *G01S 17/08* | (2006.01) | |
| *B60Q 9/00* | (2006.01) | |
| *H04N 13/00* | (2018.01) | |

(52) U.S. Cl.
CPC ......... *B60W 50/14* (2013.01); *G06K 9/00805* (2013.01); *G06T 7/50* (2017.01); *G06T 7/70* (2017.01); *G06T 15/08* (2013.01); *H04N 13/239* (2018.05); *B60Q 9/008* (2013.01); *G01S 17/08* (2013.01); *G05D 2201/0213* (2013.01); *G06K 2209/40* (2013.01); *G06T 2207/10028* (2013.01); *H04N 2013/0081* (2013.01)

(58) Field of Classification Search
USPC .......................................................... 701/28
See application file for complete search history.

(56) References Cited

U.S. PATENT DOCUMENTS

| | | | | |
|---|---|---|---|---|
| 8,699,755 | B2* | 4/2014 | Stroila | G01S 17/89 |
| | | | | 382/106 |
| 9,269,022 | B2* | 2/2016 | Rhoads | G06K 9/00208 |
| 9,519,061 | B2* | 12/2016 | Modica | G01S 17/89 |
| 2010/0217529 | A1* | 8/2010 | Stroila | G01S 17/89 |
| | | | | 702/5 |
| 2013/0300740 | A1* | 11/2013 | Snyder | G06F 3/016 |
| | | | | 345/420 |
| 2014/0063232 | A1* | 3/2014 | Fairfield | G06K 9/78 |
| | | | | 348/118 |
| 2014/0067187 | A1* | 3/2014 | Ferguson | B60W 30/00 |
| | | | | 701/28 |
| 2014/0195112 | A1* | 7/2014 | Lu | B60G 17/015 |
| | | | | 701/37 |
| 2015/0120244 | A1* | 4/2015 | Ma | G01C 15/00 |
| | | | | 702/172 |
| 2015/0138310 | A1* | 5/2015 | Fan | G06K 9/00201 |
| | | | | 348/36 |
| 2015/0202939 | A1* | 7/2015 | Stettner | B60R 21/0134 |
| | | | | 701/37 |
| 2015/0268058 | A1* | 9/2015 | Samarasekera | G06K 9/00637 |
| | | | | 701/409 |
| 2016/0004915 | A1* | 1/2016 | Chen | G06K 9/00791 |
| | | | | 348/149 |
| 2016/0187144 | A1* | 6/2016 | Modica | G01S 17/023 |
| | | | | 382/154 |
| 2016/0188996 | A1* | 6/2016 | Modica | G06F 16/9537 |
| | | | | 382/203 |
| 2016/0189385 | A1* | 6/2016 | Modica | G01S 17/89 |
| | | | | 382/103 |
| 2016/0192154 | A1* | 6/2016 | Modica | H04W 4/029 |
| 2016/0209846 | A1* | 7/2016 | Eustice | G05D 1/0246 |
| 2016/0232412 | A1* | 8/2016 | Nishijima | G06K 9/00791 |
| 2016/0259038 | A1* | 9/2016 | Retterath | G01S 7/4802 |
| 2016/0275667 | A1* | 9/2016 | Modica | G06F 3/0346 |
| 2018/0181817 | A1* | 6/2018 | Yan | G06N 3/02 |
| 2018/0189578 | A1* | 7/2018 | Yang | G01C 21/3635 |
| 2019/0019324 | A1* | 1/2019 | Wu | G06T 15/04 |
| 2019/0049560 | A1* | 2/2019 | Chattopadhyay | G06N 20/00 |
| 2019/0051056 | A1* | 2/2019 | Chiu | G06T 19/006 |
| 2019/0065824 | A1* | 2/2019 | Gaudet | G06K 9/00201 |

* cited by examiner

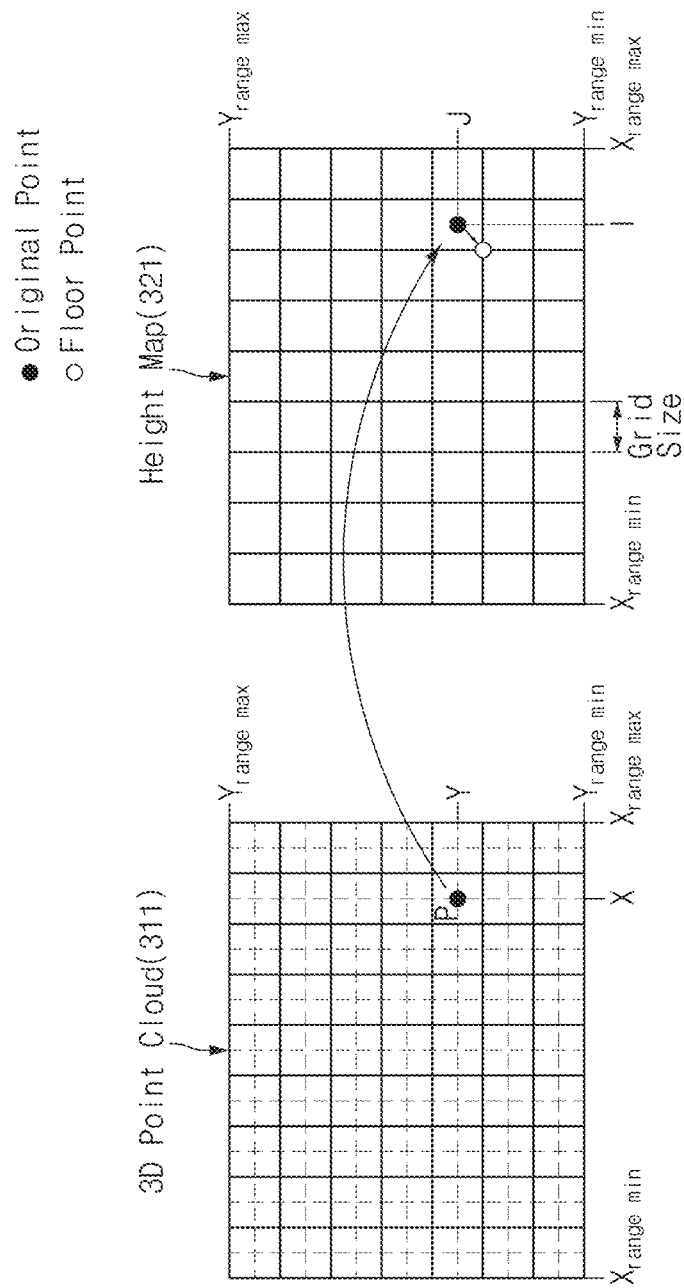

| 0 | 0 | 0 |
|---|---|---|
| 0 | 1 | 0 |
| 0 | 0 | 0 |

Binary

+

| 1.41 | 1.0 | 1.41 |
|---|---|---|
| 1.0 | 0.0 | 1.0 |
| 1.41 | 1.0 | 1.41 |

Distance Transform

APPARATUS AND METHOD FOR CONTROLLING NARROW ROAD DRIVING OF VEHICLE

CROSS-REFERENCE TO RELATED APPLICATION

This application is based on and claims the benefit of priority to Korean Patent Application No. 10-2016-0170213, filed on Dec. 14, 2016, in the Korean Intellectual Property Office, the disclosure of which is incorporated herein in its entirety by reference.

TECHNICAL FIELD

The present disclosure relates generally to vehicular control systems and, more particularly, to an apparatus and a method for controlling narrow road driving of a vehicle.

BACKGROUND

Drivers often have to drive on narrow roads due to characteristics of the roads, surrounding objects, or the like. For example, because there are many vehicles parked in alleys of residential areas, where parking spaces are narrow, roads on which drivers may have to drive can be narrow. An inexperienced driver may be susceptible to a collision due to unskilled driving and lack of experience when driving through a narrow area, and accordingly, may feel uncomfortable while driving on a narrow road.

Accordingly, a driver support system that may improve the driving control ability of the driver when a vehicle passes through a narrow road is necessary. To achieve this, various narrow road recognition systems are provided, but conventional narrow road recognition systems include, for instance, a lidar device or an ultrasonic sensor. However, a 4-layer lidar is limited in its ability to recognize an object located on a vehicle because it is generally mounted on a lower side of the vehicle. Further, an ultrasonic sensor is limited in its ability to recognize a long distance object because it may recognize only short distance objects.

SUMMARY

The present disclosure provides an apparatus and method for controlling narrow road driving of a vehicle, which may recognize a driving allowable area and an object based on a depth map and a height map when the vehicle is driven on a narrow road and determine whether the vehicle safely passes through the narrow road to allow the vehicle to safely pass through the narrow road.

The technical objects of the present disclosure are not limited to the above-mentioned one, and the other unmentioned technical objects will become apparent to those skilled in the art from the following description.

In accordance with embodiments of the present disclosure, there is provided an apparatus for controlling narrow road driving of a vehicle including: an image transform unit generating a depth map using depth information of an object in a front image of a road on which the vehicle travels and generating a height map of the front image by transforming the generated depth map; a map analysis unit recognizing the object and calculating a driving allowable area of the road based on the generated height map; a determination unit determining whether the road is a narrow road based on the calculated driving allowable area and, when the road is determined to be the narrow road, determining whether the vehicle is able to pass through the narrow road; and a signal processing unit controlling driving of the vehicle on the narrow road based on the determination of whether the vehicle is able to pass through the narrow road.

Furthermore, in accordance with embodiments of the present disclosure, there is provided a method for controlling narrow road driving of a vehicle including: generating a depth map using depth information of an object in a front image of a road on which the vehicle travels; generating a height map of the front image by transforming the generated depth map; recognizing the object and calculating a driving allowable area of the road based on the generated height map; determining whether the road is a narrow road based on the calculated driving allowable area; when the road is determined to be the narrow road, determining whether the vehicle is able to pass through the narrow road; and controlling driving of the vehicle on the narrow road based on the determination of whether the vehicle is able to pass through the narrow road.

BRIEF DESCRIPTION OF THE DRAWINGS

The above and other objects, features and advantages of the present disclosure will be more apparent from the following detailed description taken in conjunction with the accompanying drawings:

FIGS. 2A to 7 are views illustrating an operation of the apparatus according to embodiments of the present disclosure;

Figure 1:
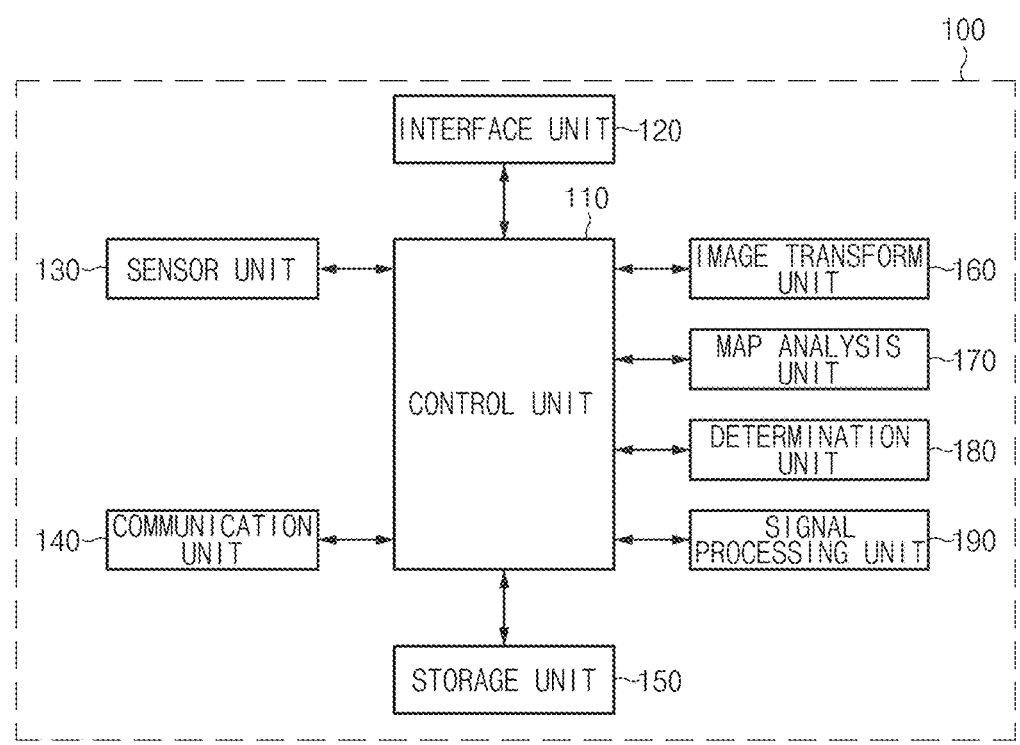
FIG. 1 is a block diagram illustrating a configuration of an apparatus for controlling narrow road driving of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the disclosed embodiments, FIG. 1 is a block diagram illustrating a configuration of an apparatus for controlling narrow road driving of a vehicle according to embodiments of the present disclosure.

The apparatus 100 for controlling narrow road driving of a vehicle according to the present disclosure may be embodied in the vehicle. For example, the apparatus 100 may be implemented using one or more control units mounted in the vehicle, and/or may be embodied as a separate apparatus to be connected to the control units of the vehicle by a separate connection unit.

Referring to FIG. 1, the apparatus 100 for controlling narrow road driving of a vehicle may include a control unit 110, an interface unit 120, a sensor unit 130, a communication unit 140, a storage unit 150, an image transform unit 160, a map analysis unit 170, a determination unit 180, and a signal processing unit 190. Here, the control unit 110 may process signals delivered between the elements of the apparatus 100 for controlling narrow road driving of the vehicle.

The interface unit 120 may include an input unit that receives a control command from a driver, and an output unit that outputs an operation state and a result of the apparatus 100 for controlling narrow road driving of the vehicle. Here, the input unit may include a key button, and may include a mouse, a joystick, a jog shuttle, and a stylus pen. Further, the input unit may include a soft key that is embodied on a display.

The output unit may include a display, and may include a voice output unit such as a speaker. When a touch sensor, such as a touch film, a touch sheet, or a touch pad, is provided in the display, the display may be operated as a touch screen, and may be embodied in a form in which an input unit and an output unit are integrated. For example, the display may include at least one of a liquid crystal display (LCD), a thin film transistor-liquid crystal display (TFT-LCD), an organic light-emitting diode (OLED), a flexible display, a field emission display (FED), and a 3D display.

The sensor unit 130 may include one or more sensors that detects an object located around the vehicle and measures a distance from the object. As an example, the sensor unit 130 may include a camera or a lidar device that may measure depth information. Of course, in addition, any sensor that may detect an object and measure a distance (i.e., depth) may be applied.

Here, the camera is a device that photographs an image around the vehicle, and for example, may be a stereo camera provided on the front side of the vehicle. The camera 120 may deliver a stereo image (i.e., "front image") obtained by photographing a front side of the vehicle to the control unit 110. Then, the control unit 110 may store the stereo image delivered from the camera 120 to the storage unit 140, and may deliver the stereo image to the map analysis unit 170.

The communication unit 140 may include a communication module that supports a communication interface with electronic components and/or control units provided in the vehicle. For example, the communication module may include a module that supports network communication of the vehicle, such as controller area network (CAN) communication, local interconnect network (LIN) communication, or Flex-Ray communication.

Further, the communication module may include a module for wireless internet connection or a module for short range communication. For example, the wireless internet technology may include wireless LAN (WLAN), wireless broadband (WiBro), Wi-Fi, or world interoperability for microwave access (WiMax), and the short range communication technology may include Bluetooth, ZigBee, ultra-wideband (UWB), radio frequency identification (RFID), and infrared data association (IrDA).

The storage unit 150 may store data and/or algorithms that are necessary for operating the apparatus 100 for controlling narrow road driving of a vehicle. The storage unit 150 may store information measured by the sensor unit 130, for example, a front stereo image (i.e., "front image") of the camera, and a location and depth information of an object in the front image (alternatively referred to herein as a "front object"). Further, the storage unit may analyze a narrow road by utilizing information measured by the sensor unit 130, may recognize a driving allowable area, and may store a control command and/or an algorithm for determining whether the vehicle will pass through the narrow road. For example, the storage unit 150 may include storage media, such as a random access memory (RAM), a static random access memory (SRAM), a read-only memory (ROM), a programmable read-only memory (ROM), and an electrically erasable programmable read-only memory (EEPROM).

The image transform unit 160 may acquire a front 2D image from the camera of the sensor unit 130, and may generate a depth map by using depth information of an object (i.e., "front object") in the front image, which is acquired from the camera or the lidar device. Further, the image transform unit 160 may transform a depth map to a height map by using location and depth information of the front object, as discussed in further detail with reference to FIGS. 2A-2C.

Figure 2:
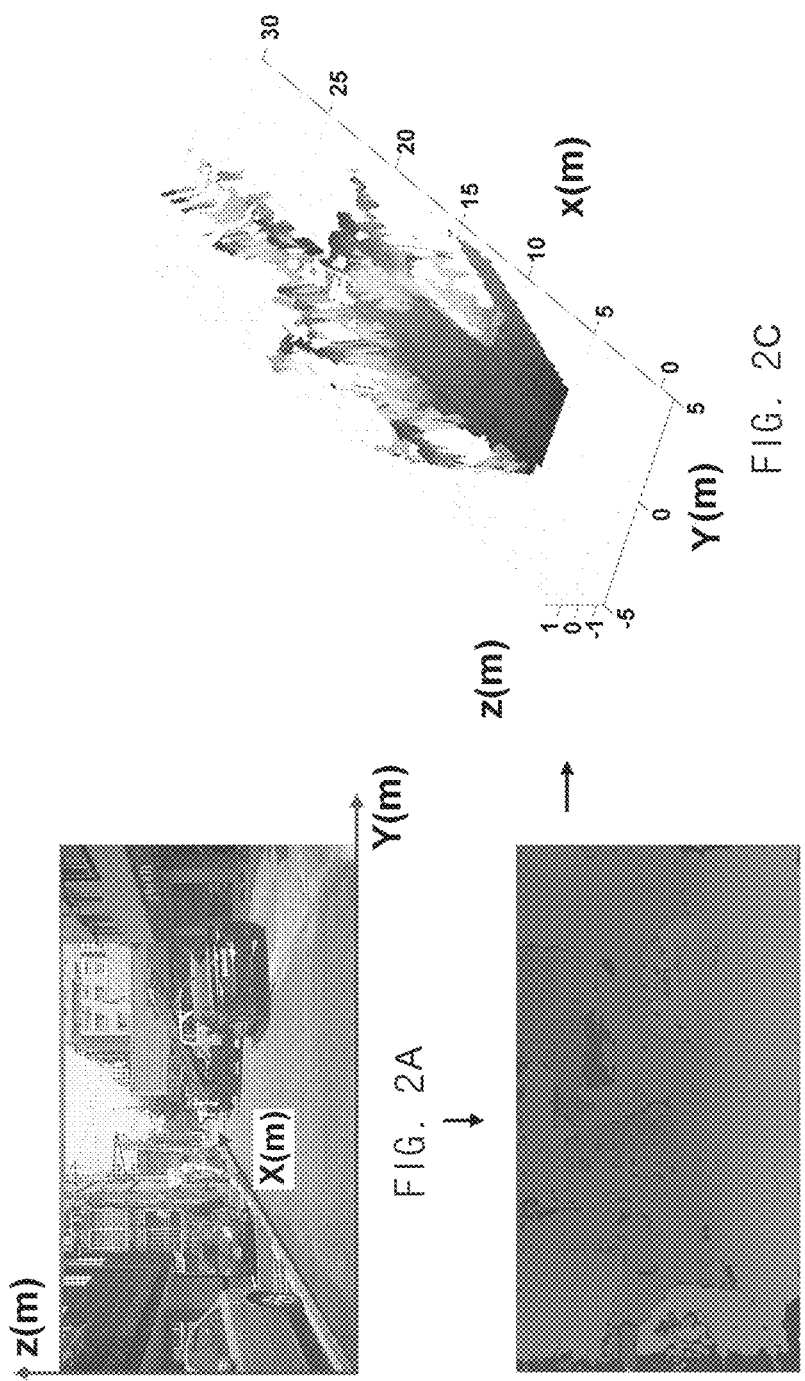

As illustrated in FIGS. 2A-2C, the image transform unit 160 may transform the front 2D image of FIG. 2A to a depth map as illustrated in FIG. 2B based on the depth information of the front object identified by the camera or the sensor, and in turn may transform the depth map of FIG. 2B to a 3D height map as illustrated in FIG. 2C by using the 2D location and the depth information of the front object.

Here, the image transform unit 160 may transform a depth map to a 3D point cloud, and may in turn transform the 3D point cloud to a height map. That is, the image transform unit 160 may recognize 3D location information the front objects based on the front 2D image and the depth information of the front objects, and may transform the depth map to a 3D point cloud based on the recognized 3D location information.

Then, the image transform unit 160 may recognize the depth information of the object, which is present in the 2D image, by using a stereo triangulation technique, as discussed in further detail with reference to FIG. 3.

Figure 3:
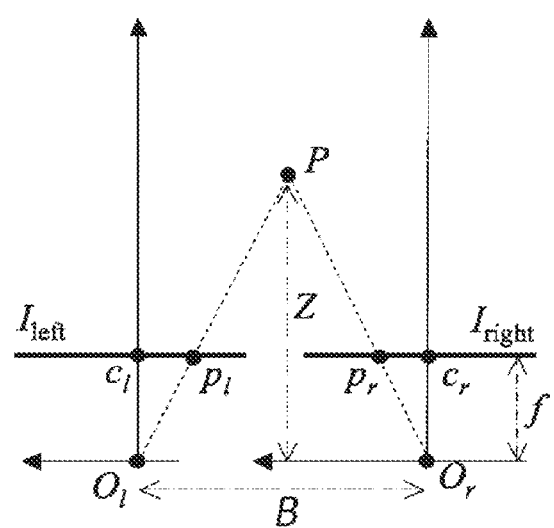

As illustrated in FIG. 3, according to the stereo triangulation technique, a point P at which the lines connecting image center points $c_l$ and $c_r$ of the stereo images, that is, the left image $I_{left}$ and the right image $I_{Right}$, the central points $O_l$ and $O_r$ of the cameras corresponding to the image center points cl and $c_r$, and the center points $O_l$ and $O_r$ of the cameras and the corresponding points ($P_l$ and $P_r$) of the left image $I_{left}$ and the right image $I_{Right}$ may be detected as a corresponding point. Then, the image transform unit 160 may extract a vertical distance from P to the camera as depth (Z) information.

In FIG. 3, the depth (Z) information may be defined as in Equation 1.

$$Z = \frac{f \cdot B}{d} \quad \text{[Equation 1]}$$

In Equation 1, f indicates a focal distance of the cameras, B indicates a distance between the left camera and the right camera, and d indicates a parallax between the left camera and the right camera.

In this way, the image transform unit 160 may transform the depth map to a 3D point cloud based on the 3D location information recognized according to the depth information acquired from the 2D image. Further, the image transform unit 160 may map the 3D point cloud to grids having a specific size, and may produce a height map by calculating a mean value of the 3D point clouds and adding the height information of the grids. FIGS. 4A and 4B describes the generation of a height map from the 3D point cloud in further detail.

Referring to FIGS. 4A and 4B, the image transform unit 160 may produce a height map by mapping points corresponding to a (X, Y) coordinate of the 3D point cloud to (I, J) coordinates of grids having a specific size. Here, I indicates an X-axis coordinate of a height map and J indicates a Y-axis coordinate of the height map, and I and J may be defined as in Equations 2 and 3.

$$I = \text{floor}\left(\frac{P \cdot \text{Cloud}(X) - X_{range\ min}}{X_{range\ max} - X_{range\ min}} \times \text{Grid Size}\right) \quad \text{[Equation 2]}$$

$$J = \text{floor}\left(\frac{P \cdot \text{Cloud}(Y) - Y_{range\ min}}{Y_{range\ max} - Y_{range\ min}} \times \text{Grid Size}\right) \quad \text{[Equation 3]}$$

In Equations 2 and 3, P.cloud indicates a coordinate of a 3D point cloud, $X_{range\ min}$ indicates a minimum value of an X coordinate area, $X_{range\ max}$ indicates a maximum value of the X coordinate area, $Y_{range\ min}$ indicates a minimum value of a Y coordinate area, $Y_{range\ max}$ indicates a maximum value of the Y coordinate area, and Grid Size indicates a size of one grid of the height map. The height information that is present in the Z-axis of the 3D point cloud may be expressed by a mean height when it is mapped to the height map. Here, the image transform unit 160 may calculate a mean height by using the count grid map and the height grid map of the 3D point clouds mapped to the grids of the height map.

The count grid map and the height grid map of the 3D point clouds mapped to the grids of the height map may be defined as in Equations 4 and 5.

Count Grid Map(I,J)=P.Cloud(I,J)+Count    [Equation 4]

Height Grid Map(I,J)=P.Cloud(I,J)+P.Cloud(Z)    [Equation 5]

In Equations 4 and 5, P.Cloud(I, J) indicates a coordinate of the 3D point cloud mapped to the height map, Count indicates the count grid map of the 3D point cloud mapped to the (I, J) coordinate, and P.Cloud(Z) indicates a Z-axis value of the 3D point cloud.

Accordingly, the image transform unit 160 may calculate a mean height map as in Equation 6 by using Equations 4 and 5.

$$\text{Mean Height Map} = \frac{\text{Height Grid Map}}{\text{Count Grid Map}} \quad \text{[Equation 6]}$$

Meanwhile, when the 3D point cloud is mapped to a height map, a coordinate that is not mapped may be generated in an integer coordinate of the height map. In this case, the corresponding coordinate may be mapped to an integer coordinate of a height map by flooring the coordinate as illustrated in FIGS. 4A and 4B.

The map analysis unit 170 recognizes a driving allowable area and an object in front of the vehicle by analyzing the height map produced by the image transform unit 160. Then, the map analysis unit 170 may estimate a road surface by extracting a point that is present at the lowest location in the height map. When the road surface corresponds to a flat road, the map analysis unit 170 may deduce a planar equation that represents a point that is present at the lowest location in the height map by using a random sample consensus algorithm (RANSAC).

The map analysis unit 170 recognizes a driving allowable area of the vehicle with reference to the road surface estimated in the height map, and recognizes points that are higher than the road surface as objects. Here, the map analysis unit 170 may represent the driving allowable area and the objects on the height map on the front image, as described in further detail with reference to FIGS. 5A and 5B.

Figures 5A, 5B:
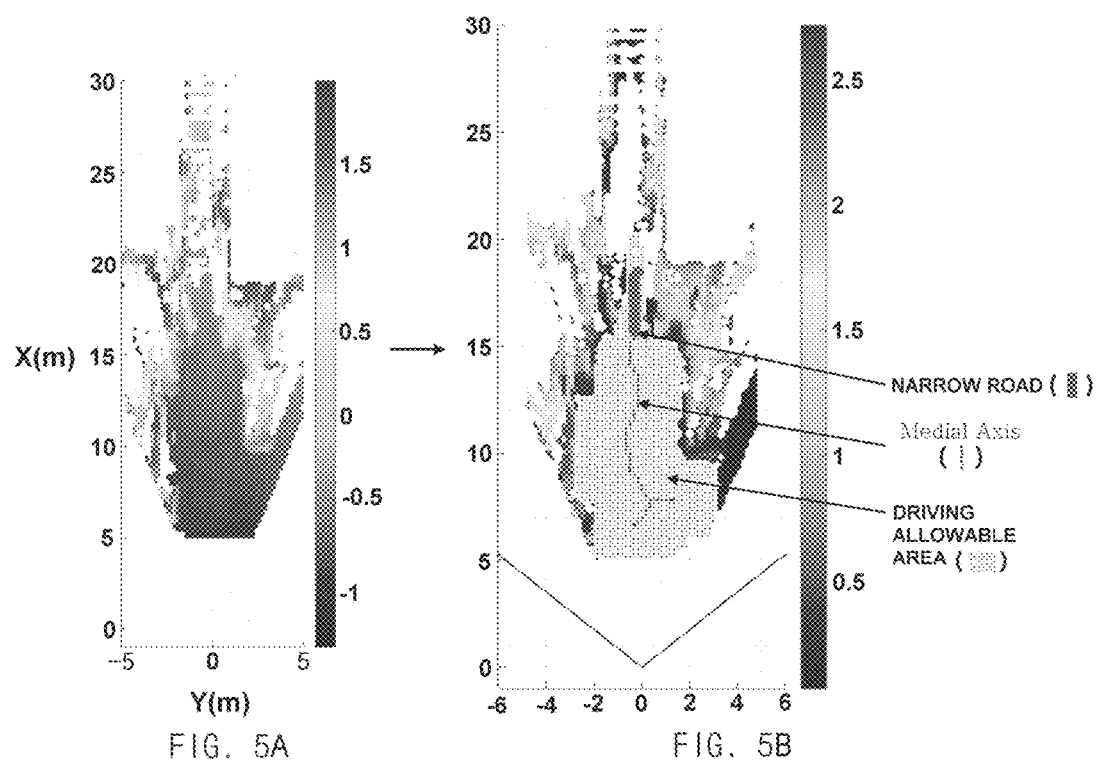

As illustrated in FIGS. 5A and 5B, the map analysis unit 170 represents the driving allowable area and the object recognized from the height map on the front image illustrated in FIG. 5A on the height map as illustrated in FIG. 5B. The determination unit 180 determines a narrow road based on the driving allowable area recognized in the map.

Figures 6A, 6B, 6C:
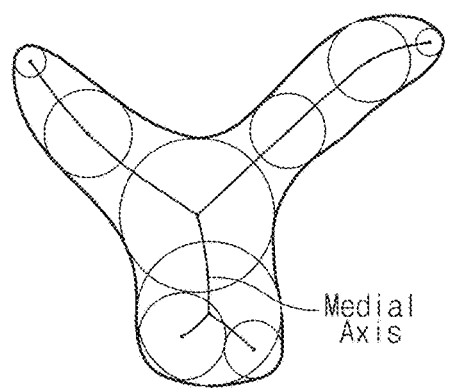

FIGS. 6A-6C describe the process of determining whether a road is narrow. As illustrated in FIG. 6A, the determination unit 180 transforms the driving allowable area to a binary area including 0s and 1s. The map analysis unit 170 may recognize a distance from the central point of the driving allowable area to a peripheral object by applying a distance transform (DT) algorithm illustrated in FIG. 6B to a binary area corresponding to the driving allowable area illustrated in FIG. 6A.

The distance from the central point of the driving allowable area to the peripheral object represents a maximum radius of a circle, of which a reference is a central point of the driving allowable area. Accordingly, the determination unit 180 may extract a medial axis of the driving allowable area by connecting the central points of the driving allowable areas. Of course, as illustrated in FIG. 5B, the determination unit 180 may represents information on the extracted medial axis of the driving allowable areas in the corresponding area of the height map. Then, a value that is present in the medial axis of the driving allowable area may be doubled such that a road width of the driving allowable area may be recognized by the determination unit 180.

The determination unit 180 may determine whether the vehicle may pass through the narrow road by comparing the total width of the vehicle including side mirrors and the recognized road width of the driving allowable area. If the determination unit 180 identifies that the vehicle cannot pass through the narrow road, the signal processing unit 190 may output a warning message through a display screen or output a warning sound through a speaker or a buzzer.

Figure 7:

Meanwhile, if the determination unit 190 identifies that the vehicle may pass through the narrow road, the signal processing unit 190 allows the driver to identify a driving allowable area by displaying the driving allowable area on a front image as illustrated in FIG. 7. Here, the signal processing unit 190 may controlling the driving of the vehicle with reference to the medial axis of the driving allowable areas.

An operational flow of the apparatus according to the present disclosure will now be described in detail.

Figure 8:
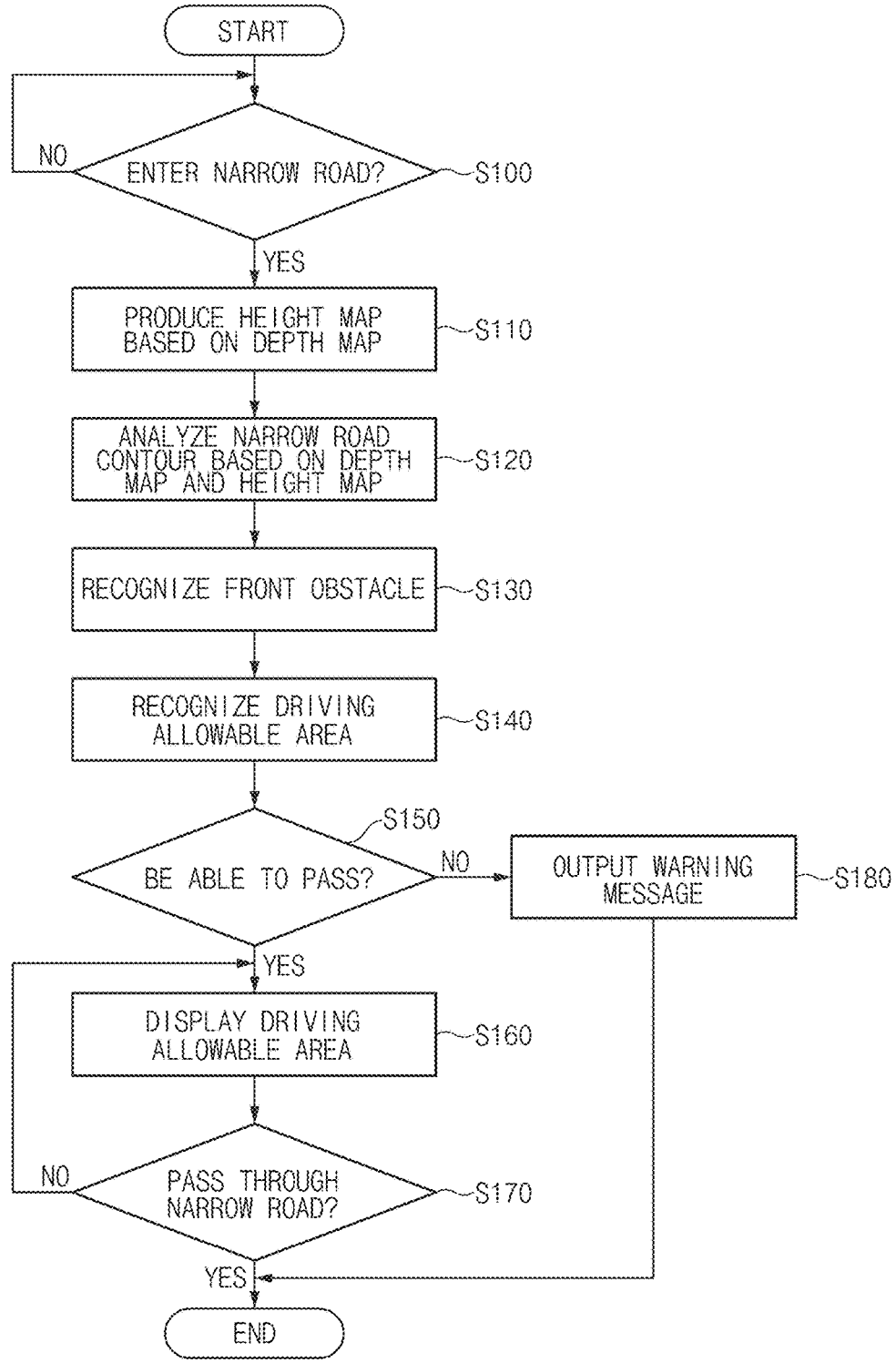
FIG. 8 is a flowchart illustrating an operation of a method for controlling narrow road driving of a vehicle according to embodiments of the present disclosure.

FIG. 8 is a flowchart illustrating an operation of a method for controlling narrow road driving of a vehicle according to embodiments of the present disclosure.

As illustrated in FIG. 8, when a vehicle enters a narrow road (S100), the apparatus 100 for controlling narrow road driving of a vehicle acquires a depth map on a front image, from a stereo camera or a lidar device, and produce a height map on the front image based on the depth map (S110).

Thereafter, the apparatus 100 for controlling narrow road driving of a vehicle may recognize a front object and a driving allowable area (S130 and S140) by analyzing a narrow road contour based on the height map (S120).

Then, the apparatus 100 for controlling narrow road driving of a vehicle may represent information on the front object and the driving allowable area, which have been recognized, in the height map produced in process S110.

The apparatus 100 for controlling narrow road driving of the vehicle determines whether the vehicle may pass through the narrow road based on the object and the driving allowable area, which have been recognized in processes S130 and S140, and if it is determined that the vehicle may pass through the narrow road (S150), may display the driving allowable area on the front image (S160).

The apparatus 100 for controlling narrow road driving of a vehicle continues to display the driving allowable area until the vehicle completely passes through the narrow road, and if the vehicle completely passes through the narrow road (S170), may terminate the related operation.

Meanwhile, if it is determined that the vehicle cannot pass through the narrow road in process S150, the apparatus 100 for controlling narrow road driving of a vehicle informs the driver of the fact by outputting a warning message (S180).

The apparatus 100 according to embodiments of the present disclosure may be embodied in a form of an independent hardware apparatus and may be driven in a form in which the apparatus 100 is included in another hardware apparatus such as a microprocessor or a general-purpose computer system, as at least one processor.

Figure 9:
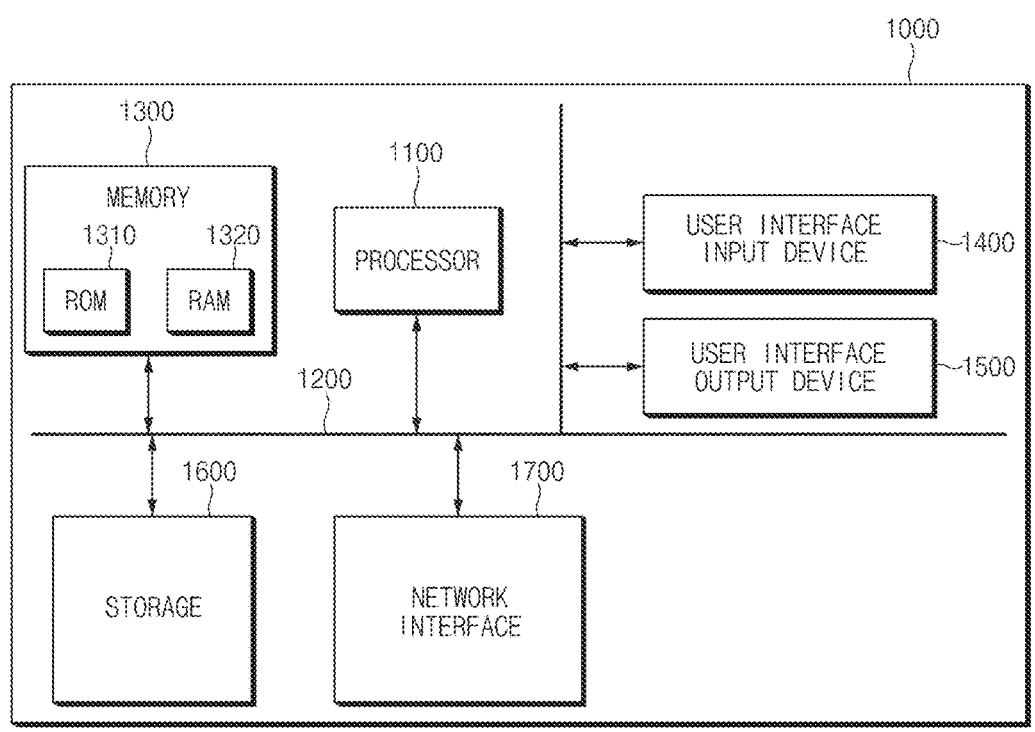
FIG. 9 is a block diagram illustrating a computing system that executes the method according to embodiments of the present disclosure.

FIG. 9 is a block diagram illustrating a computing system that executes the method according to embodiments of the present disclosure.

As shown in FIG. 9, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the present disclosure, a vehicle may pass through a narrow road safely by recognizing a driving allowable area and an object based on a depth map and a height map during driving of a narrow road and determining whether the vehicle may safely pass through the narrow road. Accordingly, convenience of the driver may be improved.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling narrow road driving of a vehicle, the apparatus comprising:
    an image transform unit generating a depth map using depth information of an object in a front image of a road on which the vehicle travels and generating a height map of the front image by transforming the generated depth map;
    a map analysis unit estimating a surface of the road based on the generated height map, recognizing the object and calculating a driving allowable area of the road based on the estimated surface of the road;
    a determination unit determining whether the road is a narrow road based on the distance from a central point of the calculated driving allowable area to the object and, when the road is determined to be the narrow road, determining whether the vehicle is able to pass through the narrow road by comparing a width of the narrow road with a width of the vehicle; and
    a signal processing unit controlling driving of the vehicle on the narrow road based on the determination of whether the vehicle is able to pass through the narrow road.

2. The apparatus of claim 1, further comprising:
    a sensor unit including a stereo camera or a lidar device.

3. The apparatus of claim 2, wherein the image transform unit acquires depth information of the object in the front image using the stereo camera or the lidar device.

4. The apparatus of claim 1, wherein the image transform unit generates 3D point clouds by transforming the depth map, and generates the height map by transforming the generated 3D point clouds.

5. The apparatus of claim 4, wherein the image transform unit recognizes a 3D location of the object in the front image based on information of the front image and the depth information, and generates the 3D point clouds by transforming the depth map based on the recognized 3D location.

6. The apparatus of claim 4, wherein the image transform unit generates the height map by transforming the 3D point clouds by mapping the 3D point clouds to grids of the height map having a predetermined size.

7. The apparatus of claim 6, wherein the image transform unit calculates a mean height of heights present on a Z-axis of the 3D point clouds and maps the calculated mean height to the height map.

8. The apparatus of claim 7, wherein the image transform unit calculates the mean height using a number of the 3D point clouds mapped to the grids of the height map and height information present on the Z-axis of the 3D point clouds.

9. The apparatus of claim 6, wherein, when a coordinate of the 3D point clouds is not mapped to the height map, the image transform unit maps the unmapped coordinate to an integer coordinate of the height map by flooring the unmapped coordinate.

10. The apparatus of claim 1, wherein the map analysis unit estimates the surface of the road by extracting a point present at a lowest location of the height map, calculates the driving allowable area based on the estimated surface of the road, and identifies points higher than the estimated surface of the road as objects.

11. The apparatus of claim 1, wherein the determination unit transforms the driving allowable area to a binary area, and calculates the distance from the central point of the driving allowable area to the object by applying a distance transform algorithm to the transformed binary area.

12. The apparatus of claim 11, wherein the determination unit represents the driving allowable area by one or more circles of which radii are the distance from the central point of the driving allowable area to the peripheral object, and extracts a medial axis of the driving allowable area by connecting central points of the one or more circles.

13. The apparatus of claim 12, wherein the determination unit recognizes a road width of the driving allowable area with reference to the medial axis of the driving allowable area.

14. The apparatus of claim 12, wherein, when it is determined that the vehicle is able to pass through the narrow road, the signal processing unit displays the driving allowable area via a display.

15. The apparatus of claim 12, wherein the signal processing unit controls the driving of the vehicle on the narrow road based on the medial axis of the driving allowable area.

16. The apparatus of claim 1, wherein, when it is determined that the vehicle is not able to pass through the narrow road, the signal processing unit outputs a warning message.

17. A method for controlling narrow road driving of a vehicle, the method comprising:
    generating a depth map using depth information of an object in a front image of a road on which the vehicle travels;
    generating a height map of the front image by transforming the generated depth map;
    estimating a surface of the road based on the generated height map;
    recognizing the object and calculating a driving allowable area of the road based on the estimated surface of the road;
    determining whether the road is a narrow road based on the distances from a central point of the calculated driving allowable area to the object;
    when the road is determined to be the narrow road, determining whether the vehicle is able to pass through the narrow road by comparing a width of the narrow road with a width of the vehicle; and
    controlling driving of the vehicle on the narrow road based on the determination of whether the vehicle is able to pass through the narrow road.

18. The method of claim 17, wherein the controlling of the driving of the vehicle on the narrow road comprises:
    when it is determined that the vehicle is able to pass through the narrow road, displaying the driving allowable area via a display; and
    when it is determined that the vehicle is not able to pass through the narrow road, outputting a warning message.

19. The method of claim 17, wherein the transforming of the depth map comprises:
- recognizing a 3D location of the object in the front image based on information of the front image and the depth information;
- generating a 3D point cloud by transforming the depth map based on the recognized 3D location; and
- generating the height map by transforming the 3D point clouds by mapping the 3D point cloud to a grid of the height map having a predetermined size.

20. The method of claim 17, wherein the determining of whether the vehicle is able to pass through the narrow road comprises:
- representing the driving allowable area by one or more circles of which radii are the distance from the central point of the driving allowable area to the peripheral object;
- extracting a medial axis of the driving allowable area by connecting central points of the one or more circles;
- calculating a width of a road corresponding to the driving allowable area based on the medial axis of the driving allowable area.

* * * * *